United States Patent [19]
Owen et al.

[11] Patent Number: 5,881,775
[45] Date of Patent: Mar. 16, 1999

[54] HEAT EXCHANGER TUBE AND METHOD FOR MAKING

[75] Inventors: Thomas K. Owen, San Jose; James R. Watts, Manteca; Milton F. Custer, Byron; Kevin D. McVicker, Fremont, all of Calif.

[73] Assignee: Hexcel Corporation, Pleasanton, Calif.

[21] Appl. No.: 778,111

[22] Filed: Jan. 2, 1997

Related U.S. Application Data

[63] Continuation of Ser. No. 328,293, Oct. 24, 1994, abandoned.

[51] Int. Cl.$^6$ ........................................ F16L 9/14
[52] U.S. Cl. ........................ 138/149; 138/150; 138/153; 138/172; 138/174; 165/180
[58] Field of Search ............................ 138/137, 140, 138/141, 144, 150, 153, 172, 174, 177, 178; 165/177, 180, 905

[56] References Cited

U.S. PATENT DOCUMENTS

| | | |
|---|---|---|
| 3,044,499 | 7/1962 | Frerich ................................ 138/149 |
| 3,112,184 | 11/1963 | Hollenbach . |
| 3,251,403 | 5/1966 | Smith . |
| 3,430,940 | 3/1969 | Criss ................................... 138/144 |
| 3,876,384 | 4/1975 | Santiago et al. ..................... 138/108 |
| 3,948,317 | 4/1976 | Moore . |
| 3,959,865 | 6/1976 | Close et al. .......................... 138/108 |
| 4,071,311 | 1/1978 | Errington ............................. 138/149 |
| 4,222,434 | 9/1980 | Clyde .................................... 138/38 |
| 4,347,271 | 8/1982 | Shannon ............................... 138/144 |
| 4,437,217 | 3/1984 | Lallaye . |
| 4,539,055 | 9/1985 | Oreutt .................................. 138/144 |
| 4,545,429 | 10/1985 | Place . |
| 4,582,126 | 4/1986 | Corey . |
| 4,852,645 | 8/1989 | Coulon . |
| 4,966,201 | 10/1990 | Svec et al. ........................... 138/149 |
| 5,042,565 | 8/1991 | Yuen . |

*Primary Examiner*—David Scherbel
*Assistant Examiner*—James F. Hook
*Attorney, Agent, or Firm*—Townsend and Townsend and Crew LLP

[57] ABSTRACT

A heat exchanger tube (2, 2a, 2b) is made using a hollow, impermeable, monolithic ceramic inner tube (4) and wrapping the inner tube with a circumferentially extending reinforcing material (12) impregnated with a slurry of ceramic particles, particle carrier medium and thermoset binder. The combination of the inner tube and the impregnated reinforcing material is first heated to solidify the thermoset binder. The combination is then sintered to drive off the particle carrier medium and themoset binder to create a two-layer heat exchanger tube including the inner tube and an outer tube (6).

9 Claims, 2 Drawing Sheets

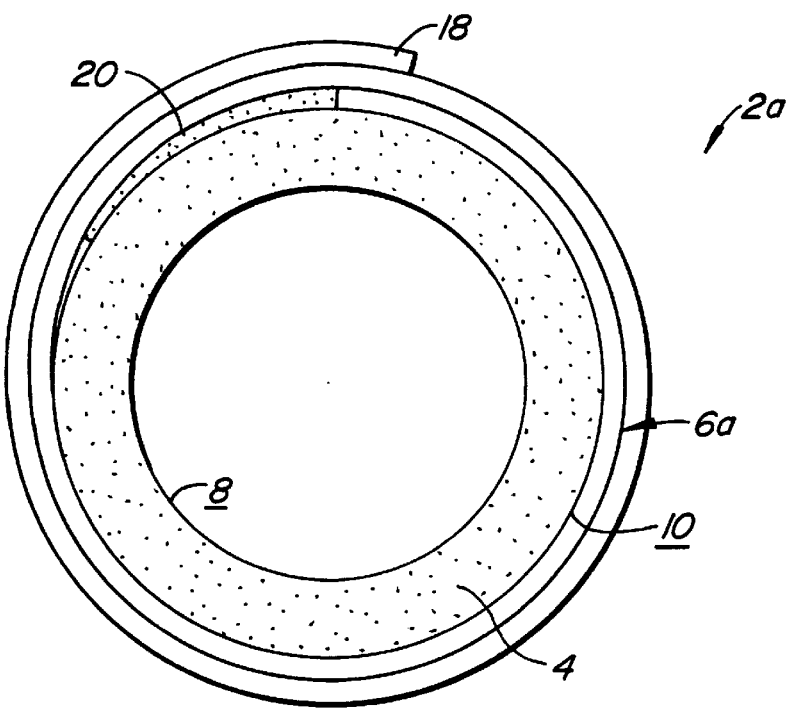
FIG. 2.
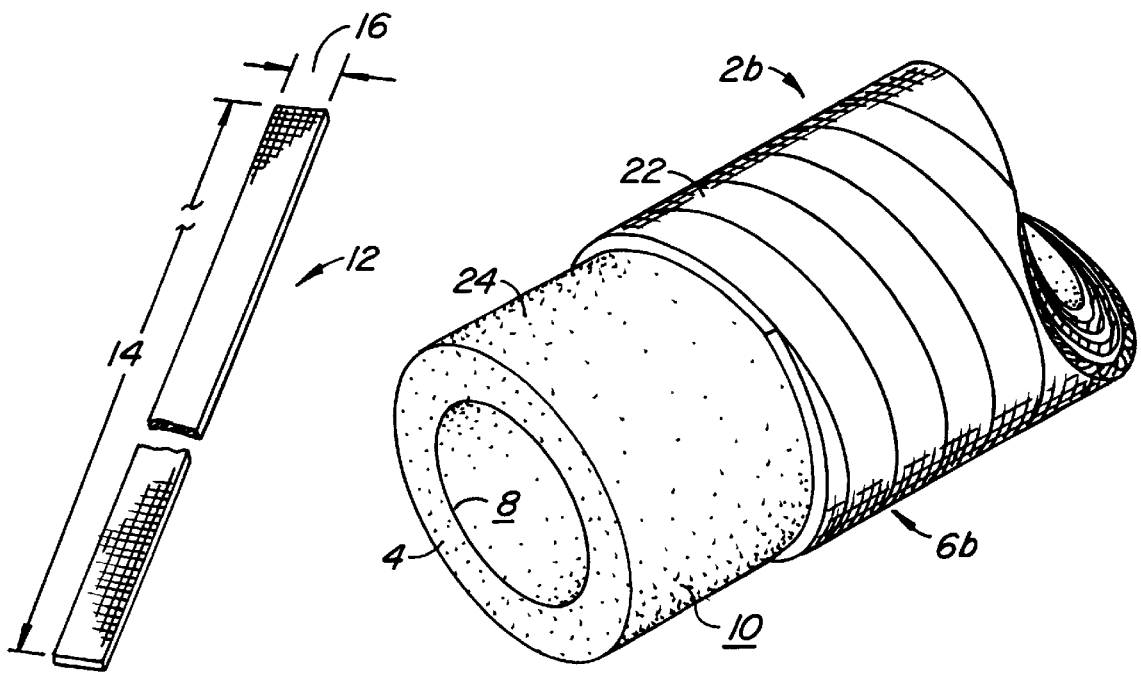
FIG. 3.
FIG. 4.

HEAT EXCHANGER TUBE AND METHOD FOR MAKING

This is a Continuation of application Ser. No. 08/328,293, filed Oct. 24, 1994 now abandoned, the disclosure of which is incorporated by reference.

BACKGROUND OF THE INVENTION

Monolithic ceramic tubes are often used in heat exchanger applications. They are used in high temperature environments and have a relatively low purchase price. In some cases the tribological properties of ceramic material are important. For example, ceramic tube heat exchangers are useful as part of coal fired regenerative heat exchangers used to supply gas turbines with high temperature (e.g., 1200° F. to 2000° F.), high pressure (e.g., 200 psi) air.

While monolithic ceramic tubes may have low initial cost, the cost effectiveness of the tubes is often not acceptable. Original flaws in the ceramic tube and flaws developed during use or by damage from external sources often culminate in catastrophic failure of the tube. That is, the flawed tube, due to the high internal pressure to which it is often subjected, blows up or explodes when it fails. In many applications, multiple tubes are in close proximity to each other and therefore, in the event of failure of one tube, the pieces of the broken tube become projectiles and destroy adjacent tubes. This creates a cascading effect and ultimately results in the destruction of many or all of the tubes in a heat exchanger. This type of failure, with pieces of broken tubes flying about, is especially destructive when the heat exchanger is used at the hot air intake of a gas turbine.

One way to get around the breakage problems of ceramic tubes is to use metal tubes instead of ceramic tubes. Two primary disadvantages of metal tubes are their temperature limitations and their corrosion limitations. In addition to the temperature and corrosion limitations, metal tubes are usually quite heavy and often suffer from fatigue failure. Metals which are more resistant to high temperatures and corrosion are very often too expensive to use.

SUMMARY OF THE INVENTION

The present invention is directed to a dual-layer heat exchanger tube which combines the low cost advantage of monolithic ceramic tubes with the damage resistance advantage of metal tubes without the high cost and weight and abbreviated life cycle associated with metal heat exchanger tubes. This results from the recognition that what is necessary is that if a ceramic tube fails, it should fail in a non-catastrophic manner.

The heat exchanger tube is made by first forming a hollow, non-porous ceramic inner tube. However, the inner tube can be a fiber or whisker reinforced article also. The inner tube provides the advantages of monolithic ceramic heat exchanger tubes, including strength, low-friction, good wear resistance, impermeability and low cost. The inner tube is preferably covered by or encased within a fiber reinforcement material. The fiber reinforcement material is preferably of the continuous fiber ceramic composite (CFCC) type, also called ceramic matrix composite (CMC), and is preferably first impregnated with a slurry of ceramic particles in a particle carrier medium and a binder. This CFCC material is made of continuous ceramic fibers which provides high strength. The CFCC material can be applied to the outside, the inside, or both the outside and the inside of the inner tube. In the preferred embodiment impregnated CFCC material is applied to the outside of the inner tube so that the invention will be described in terms of this embodiment. The CFCC material can be applied by winding filaments or tape CFCC material about the inner tube, applying fabric CFCC material to the inner tube, applying braided CFCC material to the inner tube or a combination of two or more of these methods for applying the CFCC materials.

The combination of the inner ceramic tube and impregnated CFCC material is preferably heated at a relatively low temperature to drive off at least some of the particle carrier medium and cause the thermoset binder to harden to cause the combination to become rigid. The combination is then sintered at a much higher temperature to create the dual layer tube. The resulting dual layer heat exchanger tube provides the user with the advantages of ceramic tubes for the fluid flowing through the inner tube, including low cost, good tribological properties, non-porosity, high strength and high service temperature, with the impact strength, toughness and non-brittle characteristics provided by the sintered CFCC material which constitutes, in the preferred embodiment, the outer tube.

The outer tube is strong enough to absorb the initial explosive force created when the inner tube fails under a high-pressure environment and keep the pieces of the inner tube from becoming projectiles. Any debris which may be created by a failed tube which strikes an adjacent heat exchanger tube will therefore strike the CFCC material layer of the adjacent tube in a relatively benign manner. Even if the outer tube of an adjacent heat exchanger tube is slightly damaged due to contact by particles of an adjacent heat exchanger tube which exploded, this should not affect its usefulness. This is because the strength of the heat exchanger tube, in the preferred embodiment, relies on the strength of the protected, non-porous ceramic inner tube, not on the strength of the outer tube of CFCC material. The outer tube needs to be only strong enough to substantially contain the particles of the inner tube when it fails under pressure. The outer tube could, but need not, add appreciably to the overall bursting strength of the heat exchanger tube.

Other features and advantages of the invention will appear from the following description in which the preferred embodiments have been set forth in detail in conjunction with the accompanying drawing.

BRIEF DESCRIPTION OF THE DRAWING

FIG. 2 is a simplified end view of a second alternative embodiment of the heat exchanger tube of FIG. 1;

FIG. 3 is a reduced-scale, simplified view of a length of fabric from which the outer tube of FIG. 2 is made;

FIG. 4 is a simplified isometric view of a third alternative embodiment of the heat exchanger tube of FIG. 1.

DESCRIPTION OF THE PREFERRED EMBODIMENT

Figure 1:
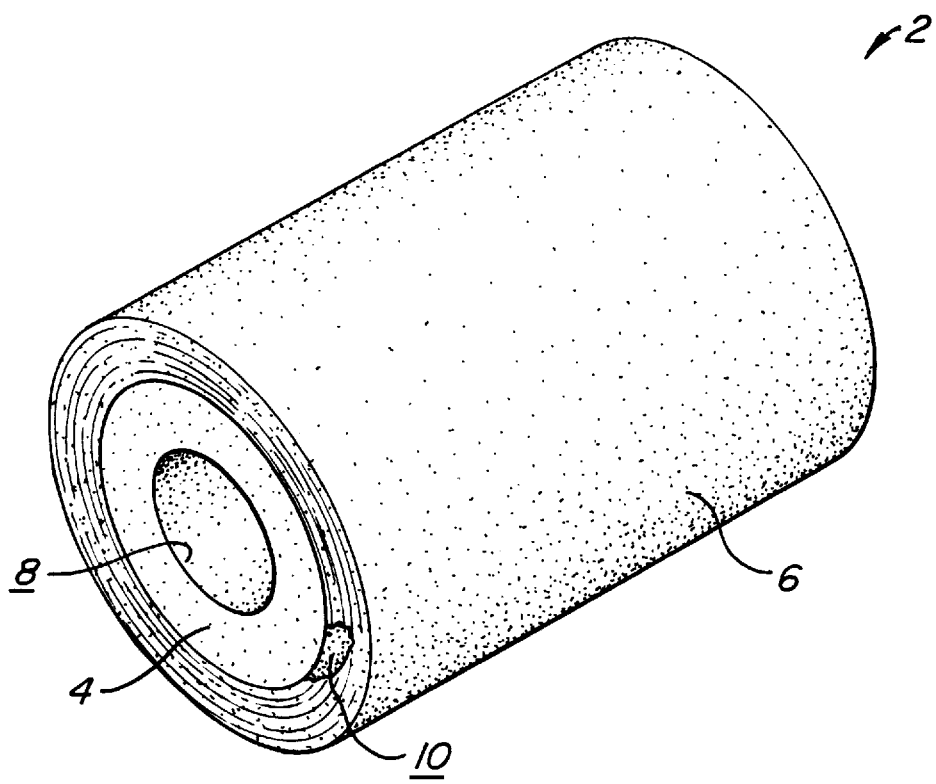
FIG. 1 is a simplified isometric view of a heat exchanger tube made according to the invention.

Heat exchanger tube 2 includes a hollow, non-porous ceramic inner tube 4 surrounded by an outer tube 6 made of continuous fiber ceramic composite (CFCC) material. Inner tube 4 has an inner surface 8 which is preferably smooth and non-porous, and an outer surface 10. Inner tube 4 is preferably made of a monolithic ceramic foam material such as mullite, silicon carbide, or alumina, by way of example. One such tube is made by the Carborundum Company of Niagara Falls, N.Y. Inner tube 4 can be made by slip casting or other techniques.

Outer tube 6 is made by encasing inner tube 4 with a flexible reinforcement layer impregnated with a ceramic slurry which is then heated to form the cured CFCC material. The reinforcement layer can be made of continuous or noncontinuous fibers, woven fibers, a fibrous non-woven mat, braided fibers, non-woven filaments or a pattern material or a combination of these. The reinforcement material used in outer tube 6 includes ceramic fibers or fabrics such as silicon carbide, silicon nitride, alumina, mullite, silica, quartz or single crystal ceramics, or a combination of them. The ceramic slurry is typically made of fine grains of alumina, mullite, lithium aluminum silicate, calcium aluminum silicate, silica, silicon carbide, silicon nitride or glass, or a combination, in a solvent, such as a ketone, with an acrylic binder, for example, methyl methacrylate and a catalyst. The reinforcement layer plus ceramic slurry is flexible and preferably somewhat tacky to help it adhere to outer surface 10 of inner tube 4 prior to firing. This combination is then overwrapped with a spiral winding of nylon or cellophane film; the wrapped tube is then placed in an oven at about 175° C. to cause the film to shrink and the acrylic thermoset binder to become rigid. The shrinkage of the film ensures intimate contact between the reinforcement layer and the inner tube and also consolidation of the reinforcement layer during subsequent sintering. Consolidation can also be accomplished by autoclaving. After removal from the oven, the nylon or cellophane film is removed (to prevent excessive smoking during sintering) and the reinforcement layer plus ceramic inner tube 4 is placed in a sintering furnace at about 900° C. for about 8 hours. Sintering drives off any remaining solvent, burns off the acrylic binder and causes the ceramic grains, the material of the reinforcement layer and to outer surface 8 of inner tube 4 to sinter.

The following example is suggested for use with coal fired regenerative heat exchangers used to supply gas turbines with heated air at about 1200° F. to 2000° F. at about 200 psi. Inner tube 4 is about 4.9 m long with a 10 cm OD and a wall thickness of 0.64 cm. Inner tube 4 is made from alumina made by Vesuvius-McDaniel Company of Beaver Falls, Pa. See FIG. 2. Outer tube 6a is made as follows. A length of fabric 12, shown schematically in FIG. 3, is made having a length 14 of about 4.9 m, or slightly less to accommodate any fittings needed to mount tube 2a between the manifolds of the heat exchangers. The width 16 of fabric 12, about 68 cm, is slightly larger then twice the circumference of the outer surface 10 of inner tube 4 so to provide the overlap 18 shown in FIG. 2. Fabric 12 is made with the majority of the continuous fibers in the direction of width 16 (that is the warp direction of the fabric) since they will provide the hoop strength needed for outer tube 6a. The minimal fibers extending in the direction of length 14 (the fill direction of the fabric) are only necessary to create the fabric and hold the warp yarns in place and are not necessary for the strength of outer tube 6a. While these fill fibers can be of the same material as the warp fibers, they can also be a material, such as nylon or rayon, which will burn out during sintering so to create a rougher outer surface for outer tube 6a for enhanced heat transfer. The proportion of warp to fill fibers (i.e., the ratio of hoop to axial fibers) can range from, for example, 30 warp, 15 fill to 50 warp, 5 fill, preferably 6 warp to 1 fill or a 6:1 ratio between hoop and axial fibers. Fabric 12 is made by weaving ceramic fibers of Nextel 610 of 3M on a conventional weaving machine, with 30 end warp and a 5 pick fill. Fabric 12 is then impregnated with a slurry consisting of the following: alumina powder, an acrylic binder, a dispersant, an acetone carrier, and an inorganic binder phase.

To reduce stress concentrations in outer layer 6a at overlap 18, a tapered spacer 20 is used between outer surface 10 and impregnated fabric 12. Spacer 20 is made of a slip cast monolithic ceramic which has been preformed. Spacer 20 eliminates sharp corners in fabric 12 which could be created at overlap 18 if spacer 20 were not used; such sharp corners could create a line of weakness in outer tube 6a. Spacer 20 is secured to outer surface 10 by incorporating it in the final wrap.

Impregnated fabric 12 is rolled onto spacer 20 and outer surface 10 of inner tube 4 using a conventional rolling table, such as made by Century Design of San Diego, Calif. The flexibility and tackiness of the impregnated fabric 12 keeps the combination together. The combination is then spiral wrapped using 2" wide nylon film (not shown). The nylon film overlaps 50% of adjacent wraps so that each pass provides two layers of the film. Other types of film, such as cellophane, which shrink upon heating can be used instead of nylon. Two passes, one in each axial direction, are preferred.

The wrapped combination is then heated in an oven at 175° C. for one hour. This causes the nylon film to shrink and ensure intimate contact between the impregnated fabric and outer surface 10 of inner tube 4. This temperature also causes the thermoset binder in the slurry to harden to make the combination a stable structure. The wrapped combination is then removed from the oven, the nylon film overwrap is removed and the combination is sintered at 900° for 8 hours to create heat exchanger tube 2a.

Outer tube 6a can be made by other methods, such as by wrapping a continuous fiber reinforced ceramic prepreg tape 22, see FIG. 4, around ceramic inner tube 4. Tape 22 is similar to impregnated fabric 12 but is about ½-inch wide and is wrapped in a spiral fashion about surface 10. The use of prepreg tape 22 allows a controlled placement of the fibers relative to the end use and the structural needs. That is, the tape can be cut or otherwise oriented such that the bulk of the fiber reinforcement is placed in, for example, the hoop direction of the tube. As can be seen in FIG. 4, the ends 24 of tube 2b are free of tape 22 to accommodate connection to conventional manifold fittings.

Further modifications and variations can be made to the disclosed embodiments without departing from the subject of the invention as defined in the following claims.

What is claimed is:

1. A heat exchanger tube comprising:
    a hollow ceramic first tube having a longitudinal axis, an inner surface and an outer surface; and
    at least one circumferentially extending, fibrous ceramic-impregnated reinforcement layer of a chosen thickness said reinforcement lying opposite of the first tube, the first tube having a thickness substantially equal to or greater than a thickness of the reinforcement layer and extending in the longitudinal direction along a substantial portion of the reinforcement layer.

2. The tube of claim 1 wherein the reinforcement layer includes woven fibers.

3. The tube of claim 1 wherein the fibrous reinforcement layer is made from fibers chosen from at least one of the following materials: ceramic, silicon carbide, silicon nitride, alumina, mullite, silica and alumino silicate.

4. The tube of claim 1 wherein the first tube is a ceramic matrix composite.

5. The tube of claim 1 wherein the first tube has a first length and the reinforcement layer has a second length less than or equal to the first length.

6. A heat exchanger tube comprising:

a hollow ceramic inner tube having a longitudinal axis, an inner surface and an outer surface; and at least one circumferentially extending fiber ceramic-impregnated reinforcement layer of a chosen thickness, said reinforcement layer comprising a substantially continuous sheet of fabric wrapped circumferentially around the outer surface of the first tube, the first tube having a thickness substantially equal to or greater than a thickness of the reinforcement layer.

7. The tube of claims 6 further comprising an outer film shrink wrapped around the sheet of fabric to bond the sheet of fabric to the inner tube.

8. A heat exchanger tube comprising:

a hollow ceramic first tube having a longitudinal axis, an inner surface and an outer surface; and at least one circumferentially extending, fibrous ceramic-impregnated reinforcement layer of a chosen thickness, said reinforcement lying opposite the outer surface of the first tube, the first tube extending in the longitudinal direction along a substantial portion of the reinforcement layer;

wherein the reinforcement layer includes woven fibers;

wherein the woven fibers include axial fibers oriented parallel to the longitudinal axis and hoop fibers oriented in a circumferential direction relative to the longitudinal axis.

9. The tube of claim 8 wherein the ratio of hoop fibers to axial fibers is between about 6 to 1 and 6 to 3.

* * * * *